United States Patent
George et al.

(10) Patent No.: US 8,951,925 B2
(45) Date of Patent: Feb. 10, 2015

(54) BROADENING THE RARE EARTH ION EMISSION BANDWIDTH, INCREASING EMISSION CROSS SECTION, AND/OR SHIFTING PEAK EMISSION WAVELENGTH IN ND-DOPED ALUMINATE OR SILICATE GLASSES

(71) Applicant: Schott Corporation, Elmsford, NY (US)

(72) Inventors: Simi George, Pittston, PA (US); Nathan Carlie, Clarks Summit, PA (US); Sally Pucilowski, Duryea, PA (US); Joseph Hayden, Clarks Summit, PA (US)

(73) Assignee: Schott Corporation, Elmsford, NY (US)

( * ) Notice: Subject to any disclaimer, the term of this patent is extended or adjusted under 35 U.S.C. 154(b) by 42 days.

(21) Appl. No.: 13/687,476

(22) Filed: Nov. 28, 2012

(65) Prior Publication Data

US 2014/0146840 A1    May 29, 2014

(51) Int. Cl.
| | |
|---|---|
| *C03C 3/12* | (2006.01) |
| *C03C 3/145* | (2006.01) |
| *C03C 3/062* | (2006.01) |
| *H01S 3/17* | (2006.01) |
| *C03C 4/12* | (2006.01) |
| *C09K 11/77* | (2006.01) |
| *H01S 3/16* | (2006.01) |
| *C03C 3/095* | (2006.01) |
| *C03C 4/00* | (2006.01) |
| *C03C 3/089* | (2006.01) |

(Continued)

(52) U.S. Cl.
CPC . *H01S 3/176* (2013.01); *C03C 4/12* (2013.01); *C09K 11/7758* (2013.01); *C09K 11/7774* (2013.01); *H01S 3/1631* (2013.01); *H01S 3/1636* (2013.01); *C03C 3/062* (2013.01); *C03C 3/095* (2013.01); *C03C 4/0071* (2013.01); *C03C 3/089* (2013.01); *C03C 3/091* (2013.01); *C03C 3/093* (2013.01); *H01S 3/175* (2013.01)

USPC .................................. 501/41; 501/52; 501/73

(58) Field of Classification Search
CPC ............ C03C 3/122; C03C 3/12; C03C 3/14; C03C 3/15; C03C 3/064; C03C 3/066; C03C 3/068
USPC .............................. 501/41, 49–52, 73, 77–79
See application file for complete search history.

(56) References Cited

U.S. PATENT DOCUMENTS

| | | | |
|---|---|---|---|
| 3,469,729 A | 9/1969 | Grekila et al. | |
| 3,711,787 A * | 1/1973 | Snitzer et al. | 372/40 |
| 3,714,059 A | 1/1973 | Shaw et al. | |

(Continued)

OTHER PUBLICATIONS

M.D. Perry et al., "Terawatt to Petawatt Subpicosecond Lasers", Science, vol. 264 (May 13, 1994) pp. 917-924.

(Continued)

*Primary Examiner* — Noah Wiese
(74) *Attorney, Agent, or Firm* — Millen, White, Zelano & Branigan, P.C.

(57) ABSTRACT

The invention relates to a Nd-doped, aluminate-based or silicate-based, laser glass having a peak emission wavelength that is longer than 1059.7 nm, an emission cross section ($\sigma_{em}$) of $\geq 1.5 \times 10^{-20}$ cm$^2$, and/or an emission bandwidth ($\Delta\lambda_{eff}$) of $\geq 28$ nm, while maintaining properties that render the glass suitable for commercial use, such as low glass transition temperature $T_g$ and low nonlinear index, $n_2$.

27 Claims, 2 Drawing Sheets

(51) Int. Cl.
*C03C 3/091* (2006.01)
*C03C 3/093* (2006.01)

(56) References Cited

U.S. PATENT DOCUMENTS

| | | | |
|---|---|---|---|
| 3,717,583 A | 2/1973 | Shaw et al. | |
| 4,217,382 A | 8/1980 | Toratani | |
| 5,526,369 A * | 6/1996 | Hayden et al. | 372/40 |
| 7,292,766 B2 * | 11/2007 | Anderson et al. | 385/142 |

OTHER PUBLICATIONS

S.E. Stokowski et al., "Nd-Doped Laser Glass Spectroscopic and Physical Properties", M-95, Rev. 2, vol. 1 (Nov. 1978).

E.W. Gaul et al., "Demonstration of a 1.1 Petawatt Laser Based on a Hybrid Optical Parametric Chirped Pulse Amplification/Mixed Nd:Glass Amplifier", Applied Optics, vol. 49, No. 9 (Mar. 20, 2010) pp. 1676-1681.

W. Koechner, "Solid-State Laser Engineering", Springer Science—Business Media—Sixth Revised and Updated Edition pp. 534-542.

C.V. Filip, "Atomic Phase Shifts in Mixed-Glass, Multi-Petawatt Laser Systems", Optics Express, vol. 19, No. 21 (Oct. 10, 2011) pp. 20953-20959.

P.R. Foy, "Fabrication and Characterization of Calcium Aluminate Glass Fibers", A dissertation submitted to the Graduate School—New Brunswick (Oct. 2008) pp. 1-166.

Partial European Search Report issued Apr. 29, 2014 in corresponding EP Application No. 13194859.8. (5 pages).

Sampaio, J.A. et al. "Structure and properties of water free $Nd_2O_3$ doped low silica calcium aluminate glasses" Journal of Non-Crystalline 247:196-202 (1999).

Laser Focus World—www.laserfocusworld.com—International Research for Technology and Applications in the Global Photonics Industry. (Apr. 2008).

* cited by examiner

BROADENING THE RARE EARTH ION EMISSION BANDWIDTH, INCREASING EMISSION CROSS SECTION, AND/OR SHIFTING PEAK EMISSION WAVELENGTH IN ND-DOPED ALUMINATE OR SILICATE GLASSES

SUMMARY OF THE INVENTION

The invention relates to glasses for use in solid laser applications, particularly short-pulse, high peak power laser applications. In particular, the invention relates to glasses for a mixed glass laser system wherein an aluminate or silicate laser glass is used in combination with a phosphate laser glass.

Further, the invention relates to Nd-doped aluminate or silicate glass, suitable for use in a mixed glass laser system, wherein (a) the Nd-doped aluminate or silicate glass has a peak emission at a wavelength above 1060 nm (particularly above 1067 nm for Nd-doped aluminate glass), (b) the Nd-doped aluminate or silicate glass has a broadened emission cross section, and/or (c) the Nd-doped aluminate or silicate glass has a broadened emission bandwidth, while maintaining properties that render the glass suitable for commercial use, such as low glass transition temperature $T_g$, high emission cross section, and low nonlinear index, $n_2$. In addition, the invention relates to a method of shifting the peak emission wavelength of the emission band width to a longer wavelength, e.g., a wavelength which is above 1060 nm for an Nd-doped silicate glass or above 1067 nm for an Nd-doped aluminate glass, and/or increasing the emission cross section, and/or broadening the emission bandwidth for a Nd-doped aluminate or silicate glass, while again maintaining properties that render the glass suitable for commercial use.

One general trend in solid state lasers is to make high energy lasers with shorter pulse lengths, which drives the power in the pulse to very high numbers. For example, a 10 k Joule laser with a 10 nsec pulse length is a power of 1 TW (1 TW=10000 J/10 nsec). The trend towards the use of high energy lasers with shorter pulse lengths is described in "Terrawatt to pettawatt subpicosecond lasers", M. D. Perry and G. Mourou, Science, Vol 264, 917-924 (1994).

In high power and short-pulse laser applications, such as the present petawatt laser systems and ultra-short pulsed lasers (lasers producing light pulses with a duration of, for example, one picosecond or less) as well as the future exawatt lasers systems, it is desirable that the solid-sate laser medium have a broad emission bandwidth. See, for example, the Hercules laser described in Laser Focus World, April 2008, pp. 19-20, which uses Ti doped sapphire crystals. An important factor in designing laser systems that utilize short pulses is to find gain materials with broad emission bandwidth for the laser transition.

For mode-locked lasers, it is a well-known result, from Fourier's theorem, that the narrower the pulse width, the larger the gain bandwidth required to generate that pulse; thus transform limited. For an inhomogeneously broadened line width of a laser medium, if the intensity of pulses follows a Gaussian function, then the resulting mode-locked pulse will have a Gaussian shape with the emission bandwidth/pulse duration relationship of: Bandwidth×Pulse Duration≥0.44. See, W. Koechner, Solid State Laser Engineering, 6ed, Springer Science, 2005 (pg 540). Clearly, to achieve ever shorter pulse durations it is a requirement to identify glasses with a broad emission bandwidth.

The absorption and emission of photons by an active ion in a gain material is proportional to the absorption and emission cross section, where the cross section represents the gain per unit length per the population inversion density. During laser operation, a high cross-section means that fewer photons are needed to saturate any given transition during pumping and stimulated emission. Thus, a high cross section is advantageous in that it improves the probability of absorption and emission in gain materials leading to higher efficiencies with better tolerance for optical losses.

Titanium-sapphire [Ti:Sapphire, Ti:Al$_2$O$_3$] crystals have a broad emission bandwidth as well as high laser cross sections over a broad region of emission. These properties, in combination with the excellent thermal, physical and optical properties of the sapphire crystal, make this a gain material of choice for active solid-state ultra-short pulsed lasers. According to the Füchtbauer-Ladenburg equation, the product of emission cross-section, emission bandwidth and radiative lifetime must be approximately constant for a given emitting ion. Thus, a high cross-section and large emission bandwidth necessitates a short lifetime. The short fluorescence lifetime of Ti:Sapphire requires pumping with other lasers (for example, Ti doped sapphire short pulse lasers are often pumped by Nd-doped glass lasers which in turn are pumped by flashlamps). This adds to the overall architecture and complexity of the laser system, particularly when attempting to scale up to exawatt or high-pettawatt peak powers. Moreover, being a crystalline material, generating large apertures of Ti:Sapphire material with the requisite optical qualities is challenging and expensive.

Another design for short pulsed lasers utilizes rare earth doped glasses. The advantages of such glasses over crystals include lower costs and higher available energies (since glass can be manufactured in large sizes of high optical quality, while Ti doped sapphire is limited in size). In addition, simpler designs can be implemented since the glass gain materials can be directly pumped by flashlamps. Unlike lasers using Ti:Sapphire crystals, the glass approach does not require one to first build pump lasers.

Laser glasses are produced by doping host glass systems with rare earth elements that have the ability to lase, such as neodymium, ytterbium, and erbium. The lasing ability of these rare earth doped laser glasses results from the light amplification achieved by stimulated emission of the excited rare earth element ions within the glass.

Glasses have a proven track record as a host matrix suitable for rare-earth ions that provide the large apertures necessary for high average power laser systems. This is especially true for phosphate glasses which can be manufactured in large quantities and can be made platinum particle free, when manufactured under the right processing conditions.

In addition to phosphate glasses, tellurite, silicates, borates, borosilicates, and aluminates have also been used as host glass matrix systems for lasing ions. Silicate, borate, borosilicates, and aluminate glasses have broader emission bandwidth for Nd lasing ions, in comparison to phosphate glasses.

However, there are disadvantages associated with the use of these glasses. For example, silicate glasses normally melt at very high temperatures, unless they contain significant amount of modifiers, such as alkali metals or alkaline earths metals. Borate glasses, on the other hand, have low temperature melting characteristics, but require substantially high concentrations of alkali metals or alkaline earth metals. Borosilicate glasses can be durable at ambient temperatures and also are melted at temperatures comparable to standard commercial glasses, such as the soda-lime glasses. However, typical commercial borosilicate glasses contain significant amounts of alkali metals, which promote high borate volatility, similar to phosphate glass, during melting. Aluminate glasses exhibit particularly broad emission bandwidths and are attractive for short pulse laser operation. But, these glasses have a very high tendency towards crystallization with a record of being exceptionally difficult to scale up to large scale manufacturing.

Unfortunately, the emission bandwidths achievable in glass hosts are typically many factors smaller than what is possible in the Ti:Sapphire crystal. For high peak power lasers using ultra-short pulses (<100 femto-second pulses or shorter), the emission bandwidths offered by known phosphate laser glasses are too narrow compared to what is needed. In order to overcome this limitation, so-called "mixed" laser glasses are used to achieve the total bandwidth requirement for the petawatt laser system that is in operation and producing the highest peak powers available today. The design of this petawatt laser is shown in, E. Gaul, M. Martinez, J. Blakeney, A. Jochmann, M. Ringuette, D. Hammond, T. Borger, R. Escamilla, S. Douglas, W. Henderson, G. Dyer, A. Erlandson, R. Cross, J. Caird, C. Ebbers, and T. Ditmire, "Demonstration of a 1.1 petawatt laser based on a hybrid optical parametric chirped pulse amplification/mixed Nd:glass amplifier," Appl. Opt. 49, 1676-1681 (2010). The laser design is shown in FIG. 1 whereas FIG. 2. shows the bandwidth achieved by using the glasses with shifted peak wavelengths. In this mixed laser glass design, phosphate and silicate glasses are used in series to achieve the total bandwidth required for current petawatt laser systems.

However, the present mixed laser glass designs are still insufficient for compact petawatt and for the future exawatt systems capable of producing high energies and short pulses. Mixed glass amplifiers with large enough apertures are expected to be one path forward for generating very high peak powers (100-1000 petawatt) and very short pulses (50-100 fs) in the future.

Thus, mixed glass amplifiers are expected to be one technology used in the future for high peak power, short pulse, multi-petawatt and exawatt laser systems. In these systems, the two glasses, each doped with lasing ions, preferably $Nd^{3+}$ ions, will be used in series. However, the two glasses will have to provide vastly different peak emission wavelengths in order to be viable for the technology to be feasible. One of the glasses in the series will need the shortest possible emission peak for the lasing ion, such as $Nd^{3+}$, while the other one will need the longest possible emission peak for the same lasing ion. All other properties should be optimized for the best laser performance. In general, in mixed glass amplifiers an Nd-doped phosphate glass is used for the shorter emission peak, and an Nd-doped silicate or aluminate glass is used for the higher emission peak.

Most commercially available, large aperture, platinum free, Nd-doped phosphate laser glasses have a peak wavelength of around 1054 nm. The shortest peak wavelength available today for a commercially available, large aperture, platinum free, Nd-doped phosphate glass is 1052.7 nm. On the other hand, the longest commercially available peak wavelength in a glass is 1059.7 nm and it is a Nd-doped silicate glass. To applicants' knowledge, no Nd-doped aluminate laser glasses are commercially available today.

Thus, for high power, short pulse, laser systems, the need exists for large aperture manufacturable rare earth-doped (preferably Nd-doped) laser glasses having peak emission wavelengths that are longer than 1059.7 and shorter than 1052.7 nm.

There are glasses in the literature that show peak wavelengths that are shorter and longer than the peaks mentioned above. Most are silicate glasses with large additions of Ti or Ta. Both of these elements lead to objectionably large nonlinear refractive index, but they are needed to obtain the desired peak wavelength and/or bandwidth. L-65, the only previously known aluminate glass for laser applications, contains 52% CaO, 32% $Al_2O_3$, 5% BaO and 10.5% $SiO_2$ with 0.5% $Nd_2O_3$ doping. Its peak is 1067 nm. However, this glass is not stable enough and has a melting point which is too high for high-homogeneity, Pt-free, large scale manufacture.

Many laser glasses are described in the handbook S. E. Stokowski et al., Nd-doped Laser Glass Spectroscopic and Physical Properties, Lawrence Livermore National Laboratory, University of California, 1981. Of the glasses described therein, the glass having the longest peak wavelength is a glass called 9016, which is a fused silica (CVD grown $SiO_2$) glass doped with 0.48 wt % $Nd_2O_3$. This glass has a peak wavelength at 1088 nm. However, the laser properties of glass 9016 are poor, for example, it has a small emission cross section of about $1.4 \times 10^{-20}$ $cm^2$.

In terms of melt properties, in order for the glass to be manufactured on a large scale basis, it is desirable for the glass to have a glass transition temperature $T_g$ of less than 850° C. With regards to laser properties, in order for the glass to be commercially useable, the glass preferably has an emission cross section of $\geq 1.5 \times 10^{-20}$ $cm^2$, and preferably has a nonlinear index, $n_2$, of <4.0.

In addition, for high power, short pulse, laser systems, the need exists for large aperture manufacturable rare earth-doped (preferably Nd-doped) laser glasses that exhibit a broad emission bandwidth and/or a high emission cross section while also achieving a peak emission wavelength of at least 1059.7 nm, preferably longer than 1059.7.

One aspect of the present invention is to provide a Nd-doped, aluminate-based or silicate-based, laser glass having a peak emission wavelength that is longer than 1059.7 nm, for example, 1062 nm or longer, preferably at least 1065 nm longer, especially at least 1068 nm or longer, while preferably maintaining properties that render the glass suitable for commercial use, such as low glass transition temperature $T_g$, high emission cross section, and low nonlinear index, $n_2$.

Another aspect of the present invention is to provide a Nd-doped aluminate-based laser glass having a peak emission wavelength that is longer than 1059.7 nm, for example, 1062 nm or longer, preferably at least 1065 nm longer, especially at least 1068 nm or longer, while preferably maintaining properties that render the glass suitable for commercial use, such as low glass transition temperature $T_g$, high emission cross section, and low nonlinear index, $n_2$.

Another aspect of the present invention is to provide a Nd-doped silicate-based laser glass having a peak emission wavelength that is longer than 1059.7 nm, for example, 1062 nm or longer, preferably at least 1065 nm longer, especially at least 1068 nm or longer, while preferably maintaining properties that render the glass suitable for commercial use, such as low glass transition temperature $T_g$, high emission cross section, and low nonlinear index, $n_2$.

A further aspect of the present invention is to provide a Nd-doped, aluminate-based or silicate-based, laser glass having an emission cross section ($\sigma_{em}$) of $\geq 1.5 \times 10^{-20}$ $cm^2$, for example, $1.6 \times 10^{-20}$ $cm^2$ or higher, preferably at least $1.8 \times 10^{-20}$ $cm^2$ or higher, while preferably also achieving a peak emission wavelength of longer than 1059.7 nm and while maintaining properties that render the glass suitable for commercial use, such as low glass transition temperature $T_g$ and low nonlinear index, $n_2$.

A further aspect of the present invention is to provide a Nd-doped aluminate-based laser glass having an emission cross section ($\sigma_{em}$) of $\geq 1.5 \times 10^{-20}$ $cm^2$, for example, $1.6 \times 10^{-}$ 20 cm² or higher, preferably at least $1.8 \times 10^{-20}$ cm² or higher, while preferably also achieving a peak emission wavelength of longer than 1059.7 nm and while maintaining properties that render the glass suitable for commercial use, such as low glass transition temperature $T_g$ and low nonlinear index, $n_2$.

A further aspect of the present invention is to provide a Nd-doped silicate-based, laser glass having an emission cross section ($\sigma_{em}$) of $\geq 1.5 \times 10^{-20}$ cm², for example, $1.6 \times 10^{-20}$ cm² or higher, preferably at least $1.8 \times 10^{-20}$ cm² or higher, while preferably also achieving a peak emission wavelength of longer than 1059.7 nm and while maintaining properties that render the glass suitable for commercial use, such as low glass transition temperature $T_g$ and low nonlinear index, $n_2$.

Another aspect of the present invention is to provide a Nd-doped, aluminate-based or silicate based, laser glass having an emission bandwidth ($\Delta\lambda_{eff}$) of $\geq 28$ nm, for example, 30 nm or higher, preferably at least 35 nm or higher, especially at least 40 nm or higher, while preferably also achieving a peak emission wavelength of longer than 1059.7 nm and while maintaining properties that render the glass suitable for commercial use, such as low glass transition temperature $T_g$ and low nonlinear index, $n_2$.

Another aspect of the present invention is to provide a Nd-doped aluminate-based laser glass having an emission bandwidth ($\Delta\lambda_{eff}$) of $\geq 28$ nm, for example, 30 nm or higher, preferably at least 35 nm or higher, especially at least 40 nm or higher, while preferably also achieving a peak emission wavelength of longer than 1059.7 nm and while maintaining properties that render the glass suitable for commercial use, such as low glass transition temperature $T_g$ and low nonlinear index, $n_2$.

Another aspect of the present invention is to provide a Nd-doped silicate based laser glass having an emission bandwidth ($\Delta\lambda_{eff}$) of $\geq 28$ nm, for example, 30 nm or higher, preferably at least 35 nm or higher, especially at least 40 nm or higher, while preferably also achieving a peak emission wavelength of longer than 1059.7 nm and while maintaining properties that render the glass suitable for commercial use, such as low glass transition temperature $T_g$ and low nonlinear index, $n_2$.

According to another aspect of the invention, there is provided a laser system using a mixed-glass arrangement and phase compensation, wherein one of the glasses of the mixed glass system is a Nd-doped, aluminate-based or silicate-based, laser glass having a peak emission wavelength that is longer than 1059.7 nm, for example, at least 2 nm longer, preferably at least 5 nm longer, especially at least 8 nm or longer.

According to another aspect of the invention, there is provided a laser system using a mixed-glass arrangement and phase compensation, wherein one of the glasses of the mixed glass system is an Nd-doped silicate-based, laser glass having a peak emission wavelength that is longer than 1059.7 nm, for example, 1062 nm or longer.

According to another aspect of the invention, there is provided a laser system using a mixed-glass arrangement and phase compensation, wherein one of the glasses of the mixed glass system is a Nd-doped, aluminate-based or silicate-based, laser glass having an emission cross section ($\sigma_{em}$) of $\geq 1.5 \times 10^{-20}$ cm², for example, $1.6 \times 10^{-20}$ cm² or higher, preferably at least $1.8 \times 10^{-20}$ cm² or higher, and a peak emission wavelength that is longer than 1059.7 nm.

According to another aspect of the invention, there is provided a laser system using a mixed-glass arrangement and phase compensation, wherein one of the glasses of the mixed glass system is a Nd-doped, aluminate-based or silicate-based, laser glass having an emission bandwidth ($\Delta\lambda_{eff}$) of $\geq 28$ nm, for example, 30 nm or higher, preferably at least 35 nm or higher, especially at least 40 nm or higher, and a peak emission wavelength that is longer than 1059.7 nm.

According to another aspect of the invention, there is provided a laser system wherein the power output of system is at least a pettawatt per pulse or greater, and wherein the system uses a mixed-glass arrangement and phase compensation and one of the glasses of the mixed glass system is a Nd-doped, aluminate-based or silicate-based, laser glass having a peak emission wavelength that is longer than 1059.7 nm, for example, at least 2 nm longer, preferably at least 5 nm longer, especially at least 8 nm or longer.

According to another aspect of the invention, a method is provided for increasing the peak emission wavelength of a Nd-doped, aluminate-based or silicate-based, laser glass by at least 2 nm, preferably at least 5 nm, especially at least 8 nm. For example, the method increases the peak emission wavelength of a Nd-doped laser glass from an average wavelength of about 1060 nm to a wavelength that is greater than about 1060 nm, such as 1062 nm or greater, preferably 1065 nm or greater, especially 1068 nm or greater.

According to a further aspect of the invention, the above-mentioned aluminate-based glass further contains ZnO and/or $B_2O_3$, for example, by partially substituting ZnO and/or $B_2O_3$ in place of $Al_2O_3$. This substitution results in lowering the melt temperature of the aluminate-based glass, which greatly facilitates the ability to scale up the manufacturing process for large scale manufacturing.

According to a further aspect of the invention, the above-mentioned aluminate-based glass further contains $Y_2O_3$. The yttrium oxide acts to not only reduce the devitirification tendency of the aluminate-based glass, but also facilitates shifting the peak emission wavelength to a higher wavelength.

Also, as described in U.S. Pat. No. 5,526,369, in state-of-the-art high energy laser system designs, a variant of the glass composition employed as the active laser medium can be used as a cladding glass which is attached with adhesives to the edges of slabs or discs fabricated from the active laser glass. The cladding glass composition is generally the same as the lasing glass, except that the lasing species is omitted form the glass (see, for example, the undoped laser fiber cladding glasses described in U.S. Pat. No. 4,217,382). In addition, the lasing species can be omitted and instead the glass is doped with one or more metal species, e.g., Cu or Sm, which impart light-filtering characteristics to the glass for use as doped laser glass claddings. Thus, another aspect of the invention is a cladding glass which has the same composition as the laser glass, except that the lasing ions are omitted and is optionally doped with copper and/or samarium oxides.

Upon further study of the specification and appended claims, further aspects and advantages of this invention will become apparent to those skilled in the art.

These aspects are achieved by incorporating certain metal oxides into the aluminate-based or silicate-based glass host system to achieve a peak emission wavelength of longer than 1059.7 nm, and/or an emission cross section ($\sigma_{em}$) of $\geq 1.5 \times 10^{-20}$ cm², and/or an emission bandwidth ($\Delta\lambda_{eff}$) of $\geq 25$ nm, while maintaining other laser properties and physical properties that render the glass suitable for commercial use.

In accordance with an embodiment of the invention, there is provided a Nd-doped aluminate glass composition in which the base glass composition comprises (based on mol %):

| | |
|---|---|
| $Al_2O_3$ | 10.00-45.00 |
| CaO | 20.00-65.00 |

-continued

| | |
|---|---|
| BaO | 0.0-15.0 |
| SiO$_2$ | 0.0-25.00 |
| B$_2$O$_3$ | 0.0-40.00 |
| Nd$_2$O$_3$ | 0.25-4.00, | wherein the base glass has a molar ratio of CaO to Al$_2$O$_3$ of 1.5 to 2.5, and a molar ratio of MO/R$_2$O$_3$ in the range of 0.5 to 3.0 (in which, in this case, MO is the sum of BaO+CaO and R$_2$O$_3$ is the sum of Al$_2$O$_3$+B$_2$O$_3$), the base glass is modified to contain an amount of Ga$_2$O$_3$, ZrO$_2$, Y$_2$O$_3$, Nb$_2$O$_5$, Ta$_2$O$_5$, Bi$_2$O$_3$, and/or ZnO, to achieve a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and wherein the resultant glass has a glass transition temperature T$_g$ of less than 850° C., and a nonlinear index, n$_2$, of <4.0.

In general, the base glass is modified to replace part of the proportion of CaO and/or Al$_2$O$_3$ with Ga$_2$O$_3$, ZrO$_2$, Y$_2$O$_3$, Nb$_2$O$_5$, B$_2$O$_3$, and/or ZnO. With regards to the individual metal oxides, the resultant glass composition can contain 0.00-40.00 mol % Ga$_2$O$_3$, 0.00-10.00 mol % ZrO$_2$, 0.00-10.00 mol % Y$_2$O$_3$, 0.00-10.00 mol % Nb$_2$O$_5$, 0.00-20.00 mol % B$_2$O$_3$, and/or 0.00-10.00 mol % ZnO. Furthermore, the glass contains at least 5.0 mol % Ga$_2$O$_3$, 1.0 mol % ZrO$_2$, 0.05 mol % Y$_2$O$_3$, 1.0 mol % Nb$_2$O$_5$, 1.0 mol % B$_2$O$_3$, or 0.5 mol % ZnO, and the sum of Al$_2$O$_3$, Ga$_2$O$_3$, ZrO$_2$, Y$_2$O$_3$, Nb$_2$O$_5$, B$_2$O$_3$, and ZnO is not more than 40 mol %.

Thus, in accordance with an embodiment of the invention, there is provided a Nd-doped aluminate glass composition comprising (based on mol %):

| | |
|---|---|
| Al$_2$O$_3$ | 0.00-40.00 |
| CaO | 20.00-65.00 |
| BaO | 0.0-8.00 |
| SiO$_2$ | 0.0-21.00 |
| B$_2$O$_3$ | 0.0-40.00 |
| Nd$_2$O$_3$ | 0.25-4.00 |
| Ga$_2$O$_3$ | 0.00-40.00 |
| ZrO$_2$ | 0.00-10.00 |
| Y$_2$O$_3$ | 0.00-10.00 |
| Nb$_2$O$_5$ | 0.00-10.00 |
| Bi$_2$O$_3$ | 0.00-10.00 |
| ZnO | 0.00-10.00 | wherein the glass contains at least 5.0 mol % Ga$_2$O$_3$, 1.0 mol % ZrO$_2$, 0.05 mol % Y$_2$O$_3$, 1.0 mol % Nb$_2$O$_5$, 0.5 mol % Bi$_2$O$_3$, or 0.5 mol % ZnO, the sum of Al$_2$O$_3$, Ga$_2$O$_3$, ZrO$_2$, Y$_2$O$_3$, Nb$_2$O$_5$, B$_2$O$_3$, Bi$_2$O$_3$, and ZnO is not more than 60 mol %, the glass composition exhibits a peak emission wavelength of longer than 1059.7 nm, and/or an emission cross section ($\sigma_{em}$) of $\geq 1.5 \times 100^{-20}$ cm$^2$, and/or an emission bandwidth ($\Delta\lambda_{eff}$) of $\geq 25$ nm, and the glass has a glass transition temperature T$_g$ of less than 850° C., and a nonlinear index, n$_2$, of <4.0.

In addition, the Nd-doped aluminate glass composition according to the invention may further contain 0.0-10 mol % of R'$_2$O$_3$, wherein R'$_2$O$_3$ is the sum of Gd$_2$O$_3$ and La$_2$O$_3$, Further, the Nd-doped aluminate glass composition according to the invention may contain 0.0-10.00 mol % of M$_2$O, wherein M$_2$O is the sum of Li$_2$O, Na$_2$O, K$_2$O, and Cs$_2$O.

Further, the Nd-doped aluminate glass composition according to the invention may contain 0.0-10.00 mol % of M'O, wherein M'O is the sum of MgO, CaO, and SrO.

In accordance with another embodiment of the invention, the Nd-doped aluminate glass composition comprises (based on mol %):

| | |
|---|---|
| Al$_2$O$_3$ | 15.00-40.00 |
| CaO | 45-62.00 |
| BaO | 0.0-5.00 |
| SiO$_2$ | 5.00-10.00 |
| Nd$_2$O$_3$ | 0.25-3.00 |
| Ga$_2$O$_3$ | 0.00-35.00 |
| ZrO$_2$ | 0.00-8.00 |
| Y$_2$O$_3$ | 0.00-8.00 |
| Nb$_2$O$_5$ | 0.00-8.00 |
| B$_2$O$_3$ | 0.00-10.00 |
| ZnO | 0.00-10.00 |
| R$_2$O$_3$ | 0.00-5.00 |
| M$_2$O | 0.00-5.00 |
| M'O | 0.00-5.00 | wherein the glass contains at least 5.0 mol % Ga$_2$O$_3$, 1.0 mol % ZrO$_2$, 0.05 mol % Y$_2$O$_3$, 1.0 mol % Nb$_2$O$_5$, 0.5 mol % Bi$_2$O$_3$, or 0.5 mol % ZnO, and the sum of Al$_2$O$_3$, Ga$_2$O$_3$, ZrO$_2$, Y$_2$O$_3$, Nb$_2$O$_5$, Bi$_2$O$_3$, and ZnO is not more than 40 mol %.

R$_2$O$_3$ is the sum of Gd$_2$O$_3$ and La$_2$O$_3$,

M$_2$O is the sum of Li$_2$O, Na$_2$O, K$_2$O, and Cs$_2$O,

M'O is the sum of MgO, CaO, and SrO, the glass composition exhibits a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and a glass transition temperature T$_g$ of less than 850° C., and a nonlinear index, n$_2$, of <4.0.

In accordance with another embodiment of the invention, there is provided a Nd-doped sodium-silicate glass composition in which the base glass composition comprises (based on mol %):

| | |
|---|---|
| SiO$_2$ | 40.00-75.00 |
| Na$_2$O | 10.00-35.00 |
| B$_2$O$_3$ | 0.00-20.00 |
| Nd$_2$O$_3$ | 0.25-4.00 |
| Sb$_2$O$_3$ | 0.00-1.00 | wherein the sum of the amounts of SiO$_2$ and Na$_2$O in the base glass is at least 84.5 mol %; and wherein the base glass is modified to contain an amount of ZrO$_2$, Nb$_2$O$_5$, Ta$_2$O$_5$, Y$_2$O$_3$, and/or La$_2$O$_3$, to achieve a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and the glass has a glass transition temperature T$_g$ of less than 850° C., and a nonlinear index, n$_2$, of <4.0.

In general, the base glass is modified to replace part of the proportion of SiO$_2$ and/or Na$_2$O with ZrO$_2$, Nb$_2$O$_5$, Ta$_2$O$_5$, Y$_2$O$_3$, and/or La$_2$O$_3$. With regards to the individual metal oxides, the resultant glass composition can contain 0.00-20.00 mol % ZrO$_2$, 0.00-20.00 mol % Nb$_2$O$_5$, 0.00-15.00 mol % Ta$_2$O$_5$, 0.00-20.00 mol % Y$_2$O$_3$, and/or 0.00-20.00 mol % La$_2$O$_3$. Furthermore, the glass contains at least 1.0 mol % ZrO$_2$, 1.0 mol % Nb$_2$O$_5$, 0.5 mol % Ta$_2$O$_5$, 0.05 mol % Y$_2$O$_3$, or 0.5 mol % La$_2$O$_3$.

Thus, in accordance with an embodiment of the invention, there is provided a Nd-doped sodium-silicate glass composition comprising (based on mol %):

| | |
|---|---|
| $SiO_2$ | 40.00-75.00 |
| $Na_2O$ | 10.00-35.00 |
| $B_2O_3$ | 0.00-20.00 |
| $Nd_2O_3$ | 0.25-4.00 |
| $Sb_2O_3$ | 0.00-1.00 |
| $ZrO_2$ | 0.00-20.00 |
| $Nb_2O_5$ | 0.00-20.00 |
| $Ta_2O_5$ | 0.00-15.00 |
| $Y_2O_3$ | 0.00-20.00 |
| $La_2O_3$ | 0.00-20.00 | wherein
the glass contains at least 1.0 mol % $ZrO_2$, 1.0 mol % $Nb_2O_5$, 0.5 mol % $Ta_2O_5$, 0.05 mol % $Y_2O_3$, or 0.5 mol % $La_2O_3$,
the glass a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and
the glass has a glass transition temperature $T_g$ of less than 850° C., and a nonlinear index, $n_2$, of <4.0.

In accordance with another embodiment of the invention, the Nd-doped sodium-silicate glass composition comprises (based on mol %):

| | |
|---|---|
| $SiO_2$ | 50.00-72.00 |
| $Na_2O$ | 10.00-22.00 |
| $B_2O_3$ | 4.00-20.00 |
| $Nd_2O_3$ | 0.25-5.00 |
| $Sb_2O_3$ | 0.05-1.00 | wherein
wherein the glass contains at least 1.0 mol % $ZrO_2$, 1.0 mol % $Nb_2O_5$, 0.5 mol % $Ta_2O_5$ 0.05 mol % $Y_2O_3$, or 0.5 mol % $La_2O_3$,
the glass a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and the glass has a glass transition temperature $T_g$ of less than 850° C., and a nonlinear index, $n_2$, of <4.0.

With regards to ranges described herein, all ranges include at least the two endpoints of the ranges, as well as all units between the two endpoints. Thus, for example, a range of 1 to 10 is to be understood as expressly disclosing at least the values of 1, 2, 3, 4, 5, 6, 7, 8, 9, and 10.

In the aluminate base glass, $Al_2O_3$ functions as the primary network former. Thus, according to another aspect, the aluminate glass composition according to the invention contains 0.00-40.00 mol % of $Al_2O_3$, for example, 10.00-40.00 mol % of $Al_2O_3$, e.g., 20.00-40.00 mol % $Al_2O_3$, or 27.00-40.00 mol % $Al_2O_3$, or 27.00-35.00 mol % $Al_2O_3$, or 27.00-32.00 mol % $Al_2O_3$.

In the aluminate glass composition, CaO in general functions as an intermediate glass former working in conjunction with $Al_2O_3$ to form the glass. Thus, according to another aspect, the aluminate glass composition according to the invention contains 20.00-65.00 mol % of CaO, for example, 30.00-60.00 mol % of CaO, or 35.00-55.00 mol % CaO, or 40.00-55.00 mol % CaO, or 45.00-55.00 mol % CaO.

According to another aspect, the aluminate glass composition according to the invention contains 0.00-8.00 mol % of BaO, for example, 2.00-8.00 mol % BaO, or 3.00-7.00 mol % BaO, or 4.00-6.00 mol % BaO. In this glass composition, BaO also generally acts as a glass modifier.

In the aluminate glass composition, $SiO_2$ generally acts as a network co-former. Thus, according to another aspect, the aluminate glass composition according to the invention contains 0.00-21.00 mol % of $SiO_2$, for example, 5.00-20.00 mol % of $SiO_2$, or 5.00-15.00 mol % $SiO_2$, or 8.00-15.00 mol % $SiO_2$, or 8.00-12.00 mol % $SiO_2$.

According to another aspect, the aluminate glass composition according to the invention contains 0.00-40.00 mol % of $B_2O_3$, for example, 1.00-40.00 mol % of $B_2O_3$, or 0.00-35.00 mol % of $B_2O_3$, or 0.00-30.00 mol % of $B_2O_3$, or 0.00-25.00 mol % of $B_2O_3$, or 1.00-20.00 mol % of $B_2O_3$, or 0.00-15.00 mol % of $B_2O_3$, or 0.00-10.00 mol % of $B_2O_3$, or 0.00-8.00 mol % of $B_2O_3$, or 2.00-8.00 mol % of $B_2O_3$, or 3.00-7.00 mol % of $B_2O_3$.

$Nd_2O_3$ provides the lasing ions for the glass composition. According to another aspect of the invention, the aluminate glass composition according to the invention contains 0.25-4.00 mol % of $Nd_2O_3$, for example, 0.25-3.00 mol % $Nd_2O_3$, or 0.25-2.00 mol % $Nd_2O_3$, or 0.25-1.00 mol % $Nd_2O_3$.

According to another aspect, the aluminate glass composition according to the invention contains 0.00-40.00 mol % of $Ga_2O_3$, for example, 5.00-40.00 mol % of $Ga_2O_3$, or 0.00-35.00 mol % of $Ga_2O_3$, or 5.00-35.00 mol % of $Ga_2O_3$, or 10.00-35.00 mol % of $Ga_2O_3$.

According to another aspect, the aluminate glass composition according to the invention contains 0.00-10.00 mol % of $ZrO_2$, for example, 1.00-10.00 mol % of $ZrO_2$, or 0.00-8.00 mol % of $ZrO_2$, or 2.00-8.00 mol % of $ZrO_2$, or 3.00-7.00 mol % of $ZrO_2$.

According to another aspect, the aluminate glass composition according to the invention contains 0.00-10.00 mol % of $Y_2O_3$, for example, 0.05-10.00 mol % of $Y_2O_3$, or 0.00-8.00 mol % of $Y_2O_3$, or 2.00-8.00 mol % of $Y_2O_3$, or 2.00-7.00 mol % of $Y_2O_3$.

According to another aspect, the aluminate glass composition according to the invention contains 0.00-10.00 mol % of $Nb_2O_5$, for example, 1.00-10.00 mol % of $Nb_2O_5$, or 0.00-8.00 mol % of $Nb_2O_5$, or 2.00-8.00 mol % of $Nb_2O_5$, or 3.00-7.00 mol % of $Nb_2O_5$.

According to another aspect, the aluminate glass composition according to the invention contains 0.50-10.00 mol % of $Bi_2O_3$, for example, 0.75-8.00 mol % of $Bi_2O_3$, or 0.75-7.00 mol % of $Bi_2O_3$, or 0.75-6.00 mol % of $Bi_2O_3$, or 0.75-5.00 mol % of $Bi_2O_3$.

According to another aspect, the aluminate glass composition according to the invention contains 0.00-10.00 mol % of ZnO, for example, 0.50-10.00 mol % of ZnO, or 1.00-10.00 mol % of ZnO, or 3.00-10.00 mol % of ZnO, or 5.00-10.00 mol % of ZnO.

According to another aspect, the sodium-silicate glass composition according to the invention contains, for example, 40.00-72.00 mol % of $SiO_2$, for example, 40.00-70.00 mol % of $SiO_2$, or 45.00-65.00 mol % of $SiO_2$ or 45.00-60.00 mol % of $SiO_2$, or 50.00-60.00 mol % of $SiO_2$.

According to another aspect, the sodium-silicate glass composition according to the invention contains 10.00-35.00 mol % of $Na_2O$, for example, 15.00-35.00 mol % of $Na_2O$, or 15.00-25.00 mol % of $Na_2O$, or 16.00-25.00 mol % of $Na_2O$ or 18.00-25.00 mol % of $Na_2O$, or 18.00-23.00 mol % of $Na_2O$.

According to another aspect, the sodium-silicate glass composition according to the invention contains 0.00-20.00 mol % of $B_2O_3$, for example, 1.00-18.00 mol % of $B_2O_3$, or 5.00-18.00 mol % of $B_2O_3$, or 5.00-15.00 mol % of $B_2O_3$, or 10.00-18.00 mol % of $B_2O_3$.

According to another aspect, the sodium-silicate glass composition according to the invention contains 0.25-4.00 mol % of $Nd_2O_3$, for example, 1.00-4.00 mol % of $Nd_2O_3$ or 1.00-2.50 mol % of $Nd_2O_3$.

According to another aspect, the sodium-silicate glass composition according to the invention contains 0.00-20.00 mol % of $ZrO_2$, for example, 1.00-20.00 mol % of $ZrO_2$, or 0.00-15.00 mol % of $ZrO_2$, or 0.00-10.00 mol % of $ZrO_2$, or 0.00-8.00 mol % of $ZrO_2$, or 1.00-8.00 mol % of $ZrO_2$, or 2.00-8.00 mol % of $ZrO_2$, or 3.00-7.00 mol % of $ZrO_2$.

According to another aspect, the sodium-silicate glass composition according to the invention contains 0.00-20.00 mol % of $Nb_2O_5$, for example, 1.00-20.00 mol % of $Nb_2O_5$, or 0.00-15.00 mol % of $Nb_2O_5$, or 0.00-10.00 mol % of $Nb_2O_5$, or 0.00-8.00 mol % of $Nb_2O_5$, or 1.00-8.00 mol % of $Nb_2O_5$, or 2.00-8.00 mol % of $Nb_2O_5$, or 3.00-7.00 mol % of $Nb_2O_5$.

According to another aspect, the sodium-silicate glass composition according to the invention contains 0.00-15.00 mol % of $Ta_2O_5$, for example, 0.50-15.00 mol % of $Ta_2O_5$, or 0.00-12.00 mol % of $Ta_2O_5$, or 0.00-10.00 mol % of $Ta_2O_5$, or 0.00-8.00 mol % of $Ta_2O_5$, or 1.00-8.00 mol % of $Ta_2O_5$, or 2.00-8.00 mol % of $Ta_2O_5$, or 3.00-7.00 mol % of $Ta_2O_5$.

According to another aspect, the sodium-silicate glass composition according to the invention contains 0.00-20.00 mol % of $Y_2O_3$, for example, 0.50-20.00 mol % of $Y_2O_3$, or 1.00-20.00 mol % of $Y_2O_3$, or 0.00-15.00 mol % of $Y_2O_3$, or 0.00-10.00 mol % of $Y_2O_3$, or 0.00-8.00 mol % of $Y_2O_3$, or 0.50-8.00 mol % of $Y_2O_3$, or 2.00-8.00 mol % of $Y_2O_3$, or 3.00-7.00 mol % of $Y_2O_3$.

According to another aspect, the sodium-silicate glass composition according to the invention contains 0.00-20.00 mol % of $La_2O_3$, for example, 0.50-20.00 mol % of $La_2O_3$, or 1.00-20.00 mol % of $La_2O_3$, or 0.00-15.00 mol % of $La_2O_3$, or 0.00-10.00 mol % of $La_2O_3$, or 0.00-8.00 mol % of $La_2O_3$, or 0.50-8.00 mol % of $La_2O_3$, or 2.00-8.00 mol % of $La_2O_3$, or 3.00-7.00 mol % of $La_2O_3$.

With regards to the additional components, the glass contains a maximum of 4 weight percent, especially a maximum of 2 weight percent, of conventional additives or impurities, such as refining agents (e.g., $As_2O_3$ and $Sb_2O_3$) and antisolarants (e.g., $Nb_2O_5$). In addition, the glass composition may contain halides to help dry the melt or residual water and to help refining of the glass. For example, the glass composition may contain up to 9 wt % F, preferably not more 5 wt %, and, up to 5 wt % Cl, although Cl is less preferred than F.

In accordance with another aspect of the invention, the aluminate or sodium silicate glass compositions according to the invention possesses a peak emission bandwidth of at least 1060 nm, preferably at least 1061 nm, especially at least 1065 nm, for example 1060 nm-1069 nm or 1060 nm-1068 nm or 1060 nm-1067 nm.

In accordance with another aspect of the invention, the aluminate or sodium silicate glass compositions according to the invention possesses an emission cross section ($\sigma_{em}$) of $\geq 1.5 \times 10^{-20}$ cm$^2$, preferably at least $1.8 \times 10^{-20}$ cm, especially at least $2.0 \times 10^{-20}$ cm, for example $1.6 \times 10^{-20}$-$2.8 \times 10^{-20}$ cm or $1.8 \times 10^{-20}$-$2.7 \times 10^{-20}$ or $2.0 \times 10^{-20}$-$2.7 \times 10^{-20}$.

In accordance with another aspect of the invention, the aluminate or sodium silicate glass compositions according to the invention possesses an effective emission bandwidth ($\Delta\lambda_{eff}$) of at least 30 nm, preferably at least 35 nm, especially at least 37 nm, and in particular at least 40 nm, for example 34-40 nm or 38-40 nm.

Laser properties can be measured in accordance with the Judd-Ofelt theory, the Fuchtbauer-Ladenburg theory, or the McCumber method. A discussion of the Judd-Ofelt theory and the Fuchtbauer-Ladenburg theory can be found in E. Desurvire, *Erbium Doped Fiber Amplifiers*, John Wiley and Sons (1994). The McCumber method is as discussed in, for example, Miniscalco and Quimby, Optics Letters 16(4) pp 258-266 (1991). See also Kassab, Journal of Non-Crystalline Solids 348 (2004) 103-107. The Judd-Ofelt theory and the Fuchtbauer-Ladenburg theory evaluate laser properties from an emission curve, whereas the McCumber method uses the absorption curve of the glass.

Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first way is to simply measure the width at half of the maximum value (called emission bandwidth full width half maximum or $\Delta\lambda_{FWHM}$).

The second method divides every point on the emission curve by the total area under the curve. The result, called a linewidth function, will have a peak value that is defined as the inverse of the effective bandwidth, $\Delta\lambda_{eff}$. By this method the entire emission curve always contributed to the emission bandwidth result. It is this value used herein in the analysis as the best indicator of emission bandwidth.

BRIEF DESCRIPTION OF THE DRAWINGS

The invention and further details, such as features and attendant advantages, of the invention are explained in more detail below on the basis of the exemplary embodiments which are diagrammatically depicted in the drawings, and wherein.

EXAMPLES

Figure 1:
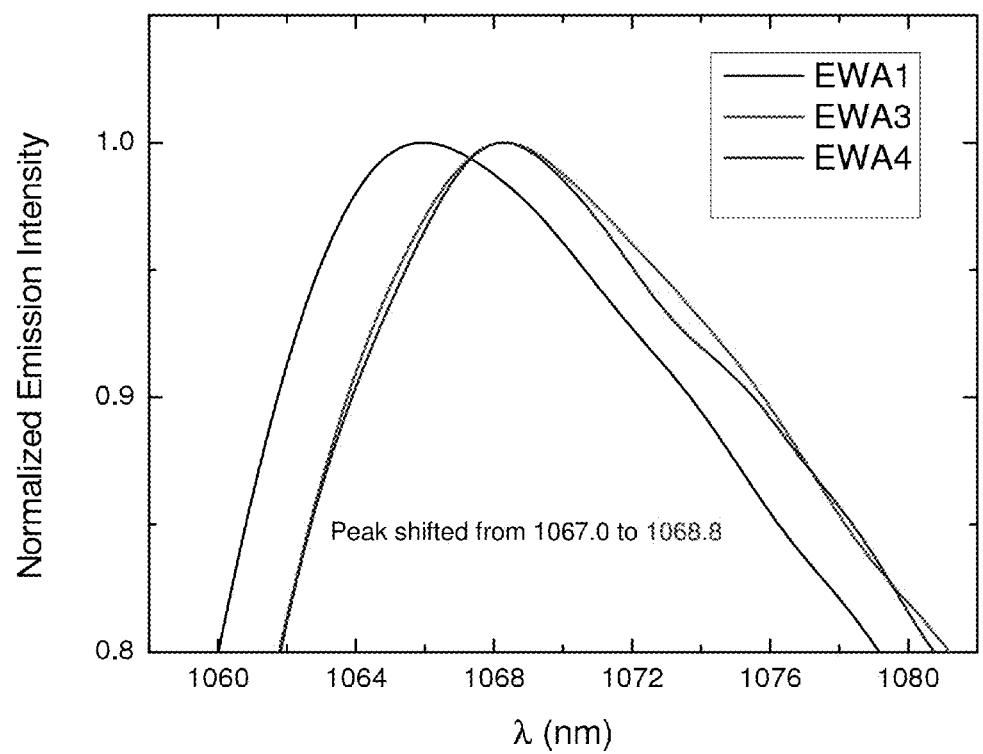
FIG. 1 graphically illustrates the shift in the peak emission wavelength of an aluminate base glass to a longer wavelength and broadening of the emission cross section due to the addition of ZnO.
Figure 2:
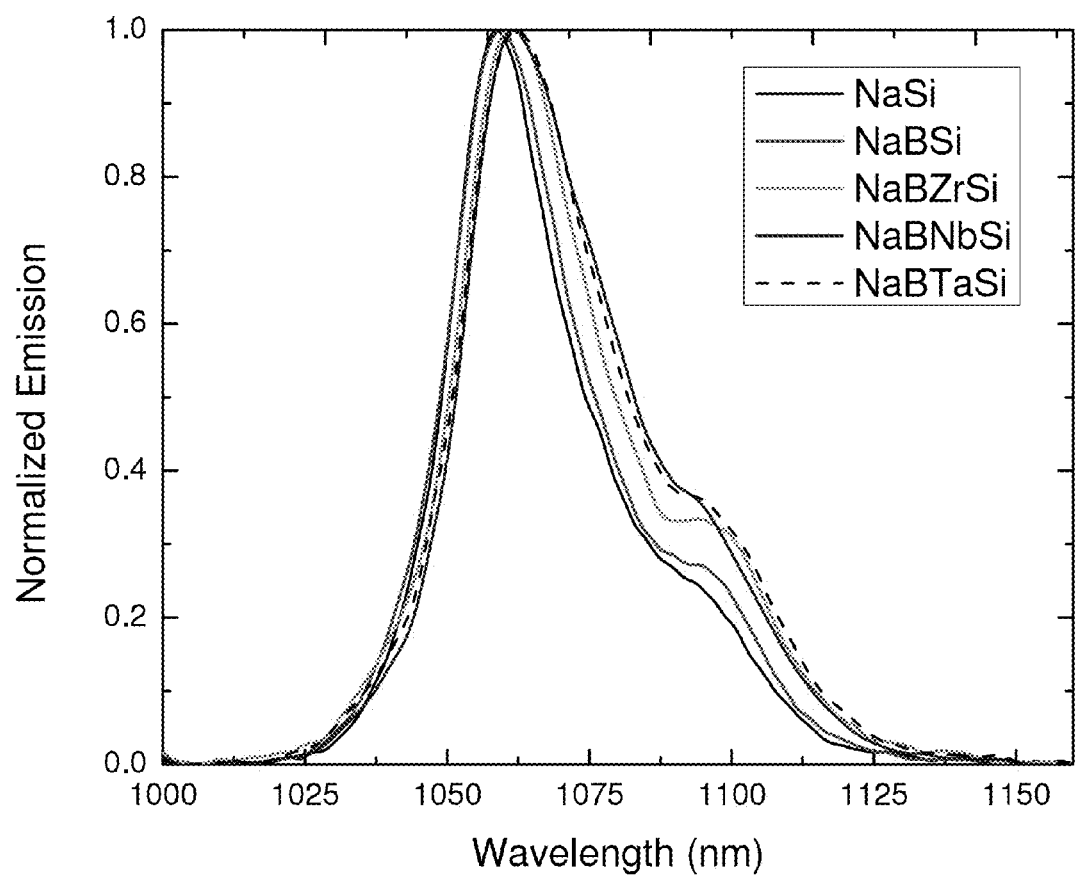
FIG. 2 graphically illustrates the shift in the peak emission wavelength of an sodium-silicate base glass to longer wavelengths and the broadening of the emission cross section due to the addition of $B_2O_3$ and transition metal oxides.

All of the glasses were made using laser grade ingredients and melted under a dry oxygen environment with the help of stirring using a platinum stirrer for better homogeneity. All of the glasses were cast into a mold and this was appropriately annealed in order to remove the stress as the liquid cools to the amorphous state. The resulting glass slab was shaped into forms required for use with the instruments that provide various properties for glasses.

Tables 1A-1C list aluminate compositions in accordance with the invention, and Table 3 lists sodium-silicate compositions in accordance with the invention. The results of these property measurements and calculations are detailed in Tables 2A-2C for the aluminate glasses according to the invention and in Table 4 for the sodium-silicate glasses according to the invention.

TABLE 1A

Aluminate Based Glass System

| Metal Oxide (mol %) | Base Glass | Ex. 1 | Ex. 2 | Ex. 3 | Ex. 4 | Ex. 5 | Ex. 6 | Ex. 7 |
|---|---|---|---|---|---|---|---|---|
| CaO | 52.00 | 52.00 | 52.00 | 52.00 | 52.00 | 47.00 | 47.00 | 47.00 |
| $Nd_2O_3$ | 0.50 | 0.50 | 0.50 | 0.50 | 0.50 | 0.50 | 0.50 | 0.50 |
| BaO | 5.00 | 5.00 | 5.00 | 5.00 | 5.00 | 5.00 | 5.00 | 5.00 |

TABLE 1A-continued

Aluminate Based Glass System

| Metal Oxide (mol %) | Base Glass | Ex. 1 | Ex. 2 | Ex. 3 | Ex. 4 | Ex. 5 | Ex. 6 | Ex. 7 |
|---|---|---|---|---|---|---|---|---|
| $SiO_2$ | 10.50 | 10.50 | 10.50 | 10.50 | 10.50 | 10.50 | 10.50 | 10.50 |
| $Al_2O_3$ | 32.00 | 20.00 | | 27.00 | 27.00 | 32.00 | 32.00 | 32.00 |
| $Ga_2O_3$ | | | 12.00 | 32.00 | | | | |
| $ZrO_2$ | | | | | 5.00 | | | |
| $Y_2O_3$ | | | | | | 5.00 | | |
| $MoO_2$ | | | | | | | 5.00 | |
| $WO_3$ | | | | | | | | 5.00 |
| $Ta_2O_5$ | | | | | | | | | 5.00 |

TABLE 1B

Aluminate Based Glass System

| Metal Oxide (mol %) | Base Glass | Ex. 8 | Ex. 9 | Ex. 10 | Ex. 11 | Ex. 12 | Ex. 13 | Ex. 14 |
|---|---|---|---|---|---|---|---|---|
| CaO | 52.00 | 47.00 | 49.50 | 47.00 | 52.00 | 52.00 | 52.00 | 52.00 |
| $Nd_2O_3$ | 0.50 | 0.50 | 0.50 | 0.50 | 0.50 | 0.50 | 0.50 | 0.50 |
| BaO | 5.00 | 5.00 | 4.70 | 5.00 | 5.00 | 5.00 | 5.00 | 5.00 |
| $SiO_2$ | 10.50 | 10.50 | 10.00 | 10.50 | 10.50 | 10.50 | 10.50 | 10.50 |
| $Al_2O_3$ | 32.00 | 32.00 | 19.00 | | 27.00 | 22.70 | 22.00 | 30.75 |
| $Ga_2O_3$ | | | 11.40 | 32.00 | | | | |
| $ZrO_2$ | | | 4.80 | 5.00 | | | | |
| $Nb_2O_5$ | | 5.00 | | | | | | |
| $B_2O_3$ | | | | | 5.00 | | | |
| ZnO | | | | | | 9.30 | 7.50 | |
| $Y_2O_3$ | | | | | | | 2.50 | |
| $La_2O_3$ | | | | | | | | 1.25 |

TABLE 1C

Aluminate Based Glass System

| Metal Oxide (mol %) | Base Glass | Ex. 15 | Ex. 16 | Ex. 17 | Ex. 18 | Ex. 19 | Ex. 20 | Ex. 21 |
|---|---|---|---|---|---|---|---|---|
| CaO | 52.00 | 52.00 | 52.00 | 52.00 | 52.00 | 47.00 | 47.00 | 47.00 |
| $Nd_2O_3$ | 0.50 | 0.50 | 0.50 | 0.50 | 0.50 | 0.50 | 0.50 | 0.50 |
| BaO | 5.00 | 5.00 | 5.00 | 5.00 | 5.00 | 5.00 | 5.00 | 5.00 |
| $SiO_2$ | 10.50 | 10.50 | 10.50 | 10.50 | 10.50 | 10.50 | 10.50 | 10.50 |
| $Al_2O_3$ | 32.00 | 27.00 | 31.00 | 31.12 | 30.88 | 32.00 | 32.00 | 27.00 |
| $TiO_2$ | | 5.00 | | | | | | |
| $B_2O_3$ | | | | | | | | 5.00 |
| $Ta_2O_5$ | | | 1.00 | | | | | |
| $Bi_2O_3$ | | | | 0.88 | | | | |
| $Gd_2O_3$ | | | | | 1.12 | | | |
| $Na_2O$ | | | | | | 5.00 | | |
| $Li_2O$ | | | | | | | | 5.00 |
| SrO | | | | | | | 5.00 | |

TABLE 2A

Laser Properties of Aluminate Based Glasses

| Laser Properties | Base Glass | Ex. 1 | Ex. 2 | Ex. 3 | Ex. 4 | Ex. 5 | Ex. 6 | Ex. 7 |
|---|---|---|---|---|---|---|---|---|
| $\lambda_{Peak}$ [nm] | 1067.00 | 1067.02 | High temperature melting | 1068.12 | 1068.80 | High temperature melting | High temperature melting | High temperature melting |
| $\Delta\lambda_{eff}$ [nm] | 48.26 | 45.47 | | 46.11 | 47.15 | | | |
| Peak $\sigma_{em}$ [$10^{-20}$ $cm^2$] | 1.8 | 1.9 | | 2.5 | 2.3 | | | |
| $\Delta\lambda_{FWHM}$ [nm] | 41.2 | 37.3 | | 37.5 | 38.6 | | | |
| $\tau_R$ [μsec] | 349 | 348 | | 262 | 261 | | | |
| $\Omega_2$ [$10^{-20}$ $cm^2$] | 4.9 | 5.2 | | 5.1 | 4.7 | | | |
| $\Omega_4$ [$10^{-20}$ $cm^2$] | 4.2 | 3.3 | | 4.4 | 5.6 | | | |
| $\Omega_6$ [$10^{-20}$ $cm^2$] | 4.0 | 4.4 | | 5.8 | 4.7 | | | |
| Non-linear index, $n_2$ | 2.92 | 3.34 | | 3.11 | 3.13 | | | |
| Glass Transition Temp. $T_g$ | >835.00 | 799.5 | | 820.3 | 826.5 | | | |

TABLE 2B

Laser Properties of Aluminate Based Glasses

| Laser Properties | Base Glass | Ex. 8 | Ex. 9 | Ex. 10 | Ex. 11 | Ex. 12 | Ex. 13 | Ex. 14 |
|---|---|---|---|---|---|---|---|---|
| $\lambda_{Peak}$ [nm] | 1067.00 | 1065.89 | 1067.10 | 1065.87 | 1065.64 | 1067.74 | 1068.75 | Crystals in bulk |
| $\Delta\lambda_{eff}$ [nm] | 48.26 | 42.12 | 43.50 | 42.11 | 43.39 | 46.81 | 47.47 | |
| Peak $\sigma_{em}$ [$10^{-20}$ cm$^2$] | 1.8 | 2.2 | 2.6 | 2.5 | 2.3 | 2.0 | 1.9 | |
| $\Delta\lambda_{FWHM}$ [nm] | 41.2 | 29.8 | 36.1 | 34.8 | 35.4 | 37.6 | 39.1 | |
| $\tau_R$ [μsec] | 349 | 287 | 267 | 253 | 309 | 324 | 304 | |
| $\Omega_2$ [$10^{-20}$ cm$^2$] | 4.9 | 6.3 | 4.7 | 4.2 | 4.1 | 4.9 | 4.3 | |
| $\Omega_4$ [$10^{-20}$ cm$^2$] | 4.2 | 4.1 | 4.1 | 4.8 | 4.4 | 4.0 | 4.6 | |
| $\Omega_2$ [$10^{-20}$ cm$^2$] | 4.0 | 4.1 | 5.6 | 4.4 | 4.7 | 4.3 | 4.1 | |
| Non-linear index, $n_2$ | 2.92 | NA* | 3.64 | 5.27 | 2.52 | 3.29 | 3.35 | |
| Glass Transition Temp. $T_g$ | >835.00 | 801.3 | 816.3 | 759.0 | 774.5 | 740.2 | 749.6 | |

*NA = not available

TABLE 2C

Laser Properties of Aluminate Based Glasses

| Laser Properties | Base Glass | Ex. 15 | Ex. 16 | Ex. 17 | Ex. 18 | Ex. 19 | Ex. 20 | Ex. 21 |
|---|---|---|---|---|---|---|---|---|
| $\lambda_{Peak}$ [nm] | 1067.00 | Crystals in bulk | Crystals in bulk | 1067.94 | 1067.77 | Devitrified | 1067.64 | 1064.00 |
| $\Delta\lambda_{eff}$ [nm] | 48.26 | | | 46.76 | NA | | NA | NA |
| Peak $\sigma_{em}$ [$10^{-20}$ cm$^2$] | 1.8 | | | 1.9 | 2.0 | | 2.01 | 2.3 |
| $\Delta\lambda_{FWHM}$ [nm] | 41.2 | | | 37.6 | NA | | NA | NA |
| $\tau_R$ [μsec] | 349 | | | 324 | 316.8 | | 337.6 | 304 |
| $\Omega_2$ [$10^{-20}$ cm$^2$] | 4.9 | | | 4.8 | 4.5 | | 4.37 | 3.76 |
| $\Omega_4$ [$10^{-20}$ cm$^2$] | 4.2 | | | 4.3 | 4.6 | | 4.13 | 4.66 |
| $\Omega_6$ [$10^{-20}$ cm$^2$] | 4.0 | | | 4.3 | 4.3 | | 4.1 | 4.83 |
| Non-linear index, $n_2$ | 2.92 | | | 3.06 | NA | | 2.82 | 2.46 |
| Glass Transition Temp. $T_g$ | >835.00 | | | 817.5 | 825.2 | | 802 | NA |

*NA = not available

TABLE 3

Sodium Silicate Based Glass System

| Oxide Mol % | Base Glass | Ex. 22 | Ex. 23 | Ex. 24 | Ex. 25 | Ex. 26 | Ex. 27 | Ex. 28 | Ex. 29 |
|---|---|---|---|---|---|---|---|---|---|
| $SiO_2$ | 66.60 | 73.00 | 60.00 | 60.00 | 60.00 | 57.00 | 57.00 | 57.00 | 60.00 |
| $Al_2O_3$ | | | | | | 3.00 | 3.00 | 3.00 | |
| $B_2O_3$ | | 5.00 | 15.00 | 15.00 | 15.00 | 15.00 | 15.00 | 15.00 | 15.00 |
| $Na_2O$ | 33.30 | 22.00 | 20.00 | 20.00 | 20.00 | 20.00 | 20.00 | 20.00 | 20.00 |
| $ZrO_2$ | | | 5.00 | | 5.00 | | | | |
| $Nb_2O_5$ | | | | 5.00 | | | | | |
| $Ta_2O_5$ | | | | | 5.00 | | 5.00 | | |
| $Y_2O_3$ | | | | | | | | | 5.00 |
| $La_2O_3$ | | | | | | | | 5.00 | |
| $Nd_2O_3$ | 0.63 | 0.63 | 0.63 | 0.63 | 0.63 | 0.63 | 0.63 | 0.63 | 0.63 |
| $Sb_2O_3$ | 0.10 | 0.10 | 0.10 | 0.10 | 0.10 | 0.10 | 0.10 | 0.10 | 0.10 |

TABLE 4

Laser Properties of Sodium Silicate Based Glasses

| Property | Base Glass | Ex. 22 | Ex. 23 | Ex. 24 | Ex. 25 | Ex. 26 | Ex. 27 | Ex. 28 | Ex. 29 |
|---|---|---|---|---|---|---|---|---|---|
| $\lambda_{Peak\ calibrated}$ [nm] | 1059.18 | 1059.18 | 1061.40 | 1060.46 | 1060.92 | 1060.48 | 1059.97 | 1061.01 | 1061.00 |
| $\Delta\lambda_{eff}$ [nm] | 33.60 | 35.65 | 39.25 | 38.88 | 40.14 | 40.98 | 39.35 | 36.84 | NA |
| Peak $\sigma_{em}$ [$10^{-20}$ cm$^2$] | 1.83 | 1.57 | 1.64 | 2.06 | 1.88 | 1.9 | 2.2 | 2.6 | 2.43 |
| $\Delta\lambda_{FWHM}$ [nm] | 25.30 | 27.30 | 29.40 | 31.40 | 31.00 | 31.8 | 31.0 | 29.2 | NA |
| $\tau_R$ [μsec] | 573.60 | 626.40 | 521.30 | 401.00 | 446.70 | 432 | 376 | 355 | 376 |
| $\Omega_2$ [$10^{-20}$ cm$^2$] | 3.81 | 3.96 | 4.70 | 6.80 | 6.44 | 5.0 | 6.5 | 4.2 | 4.46 |
| $\Omega_4$ [$10^{-20}$ cm$^2$] | 3.29 | 3.05 | 3.42 | 4.16 | 4.40 | 4.0 | 4.3 | 4.5 | 4.6 |
| $\Omega_6$ [$10^{-20}$ cm$^2$] | 3.30 | 2.98 | 3.30 | 3.99 | 3.82 | 4.1 | 4.3 | 4.9 | 4.65 |

TABLE 4-continued

Laser Properties of Sodium Silicate Based Glasses

| Property | Base Glass | Ex. 22 | Ex. 23 | Ex. 24 | Ex. 25 | Ex. 26 | Ex. 27 | Ex. 28 | Ex. 29 |
|---|---|---|---|---|---|---|---|---|---|
| Non-linear index, $n_2$ | 1.41 | 1.28 | 1.50 | 2.27 | 2.23 | 1.51 | 2.14 | 1.57 | 1.46 |
| Glass Transition Temp. $T_g$ | 471.5 | 525.9 | 620.3 | 618.5 | 643.4 | 564.0 | 573.0 | 557.0 | 583.0 |

As can be seen from Tables 2A-20, the base aluminate glass example exhibits a long peak emission wavelength of 1067 nm and a broad effective emission bandwidth ($\Delta\lambda_{eff}$) of 48.26 nm, as well as a high emission cross section ($\sigma_{em}$) of $1.8 \times 10^{-20}$ cm$^2$. However, this glass exhibits a very high glass transition temperature, $T_g$, of >835° C., thereby rendering the glass unsuitable for commercialization.

In Example 1, replacing part of the $Al_2O_3$ of the base aluminate glass with $Ga_2O_3$, broadens the peak emission bandwidth without adversely impacting the peak emission wavelength. In addition, the glass of Example 1 has a higher emission cross section ($\sigma_{em}$) of $1.9 \times 10^{-20}$ cm$^2$. Although the effective emission bandwidth ($\Delta\lambda_{eff}$) for Example 1 is lower (i.e., 45.47 nm), the emission bandwidth is still very large.

In Examples 3-4, replacing part of the $Al_2O_3$ of the base aluminate glass with the transition metals $ZrO_2$ and $Y_2O_3$, appreciably increased the emission cross section ($\sigma_{em}$) ($2.5 \times 10^{-20}$ cm$^2$ and $2.5 \times 10^{-20}$ cm$^2$) while also increasing the length of the peak emission wavelength by 1-2 nm. Here again, while the effective emission bandwidth ($\Delta\lambda_{eff}$) for Examples 3 and 4 are lower than that of the base glass example (i.e., 46.11 nm and 47.15 nm), the emission bandwidth is still quite large.

In Example 8, replacing part of the CaO of the base aluminate glass with the $Nb_2O_5$, decreased the length of the peak emission wavelength, but still was very long, i.e., 1065.89 nm. Also, while the effective emission bandwidth ($\Delta\lambda_{eff}$) was lower (42.12 nm), the emission cross section ($\sigma_{em}$) did appreciably increase (i.e., $2.2 \times 10^{-20}$ cm$^2$). Similar results were achieved when replacing part of the $Al_2O_3$ with $B_2O_3$. See Example 11.

Combing $Ga_2O_3$ with a transition metal, $ZrO_2$, significantly increases the peak emission cross-section and slightly increases the length of the peak emission wavelength. See Example 9. In Example 10, which combines a higher amount of $Ga_2O_3$ with a transition metal, $ZrO_2$, the peak emission cross-section remains high and the length of the peak emission wavelength slightly decreases.

In Example 12, the addition of ZnO results in an appreciable increase in the length of the peak emission wavelength and an appreciable increase the peak emission cross-section. In Example 13, the combination of $Y_2O_3$ and ZnO results in an even greater increase in the length of the peak emission wavelength. The presence of ZnO also provides the added advantage of lowering the melt temperature of the aluminate-based glass. By lowering of the melt temperature of the aluminate-based glass allows the glass to be melted in a standard electrically heated furnace, which greatly facilitates the ability to scale up of the manufacturing process.

Replacing part of the $Al_2O_3$ with $Bi_2O_3$ both increased the peak emission cross-section bandwidth and the peak emission wavelength. See Example 17. Similarly, replacing part of the $Al_2O_3$ with $Gd_2O_3$ increased the peak emission cross-section bandwidth and the peak emission wavelength. See Example 18. Replacing part of the CaO with SrO also increased the peak emission wavelength. See Example 20. Replacing part of CaO and $Al_2O_3$ with $B_2O_3$ and $Li_2O$ decreased peak emission wavelength, but increased the peak emission cross-section bandwidth.

As can be seen from Example 22, replacing part of the $Na_2O$ of the base sodium silicate glass with $B_2O_3$ increased the peak emission bandwidth (from 33.60 nm to 35.65 nm) without adversely affecting the peak emission wavelength exhibited by the base silicate glass composition (i.e., 1059.18 nm). On the other hand, when amounts of $SiO_2$ and $Na_2O$ are replaced by $B_2O_3$ and $ZrO_2$, the peak emission wavelength was appreciably increased, while the peak emission bandwidth also increased. See Example 23. Further, replacing amounts of $SiO_2$ and $Na_2O$ by $B_2O_3$ and $Nb_2O_5$ appreciably increased both the peak emission wavelength and the emission bandwidth, and increased the emission cross section ($2.06 \times 10^{-20}$ cm$^2$ v. $1.83 \times 10^{-20}$ cm$^2$). See Example 24. When amounts of $SiO_2$ and $Na_2O$ are replaced by $B_2O_3$ and $Ta_2O_5$, a greater increase in peak emission wavelength and the emission bandwidth are obtained, and the emission cross section also increased. See example 25.

It is important to note that the gains in the emission bandwidth and peak wavelength, did not reduce the emission cross-section in examples 23 and 24. According to Füchtbauer and Ladenburg, this requires a reduction of the radiative lifetime ($\tau_R$) which can also be seen to occur in the figure. It is generally desirable to maintain lifetime values greater than ~200 µs in order to allow efficient pumping by flash lamp, while also maintaining a cross-section of ~$2.0 \times 10^{-20}$ cm$^2$ in order to allow efficient energy storage and extraction. This minimum value for lifetime is exceeded for all examples herein, and the minimum cross-section target is maintained for examples 3, 4, 8-12 and 23, illustrating the particular utility of ZnO, $Y_2O_3$, $Nb_2O_5$ and $B_2O_3$, as these oxides can serve to increase both bandwidth and emission cross-section in both glass systems.

In Examples 26-28 part of the $SiO_2$ of the base sodium silicate glass is replaced by a combination of $Al_2O_3$ and $ZrO_2$, $Ta_2O_5$ or with $La_2O_3$. In each case, in comparison to the base sodium silicate glass, the glass exhibited a higher peak emission wavelength, an increased peak emission bandwidth, and an increased emission cross section ($2.6 \times 10^{-20}$ cm$^2$ in the case of Example 28). In Example 29, part of the $SiO_2$ and part of $Na_2O$ are replaced with $B_2O_3$ and $Y_2O_3$. This resulted in a higher peak emission wavelength and an increased emission cross section.

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A Nd-doped aluminate glass composition comprising (based on mol %):

| | |
|---|---|
| $Al_2O_3$ | 0.00-40.00 |
| CaO | 20.00-65.00 |
| BaO | 0.0-8.00 |
| $SiO_2$ | 0.0-21.00 |
| $B_2O_3$ | 0.0-40.00 |
| $Nd_2O_3$ | 0.25-4.00 |
| $Ga_2O_3$ | 0.00-40.00 |
| $ZrO_2$ | 0.00-10.00 |
| $Y_2O_3$ | 0.00-10.00 |
| $Nb_2O_5$ | 0.00-10.00 |
| $Bi_2O_3$ | 0.00-10.00 |
| ZnO | 0.00-10.00 | wherein
the glass contains at least 5.0 mol % $Ga_2O_3$, 1.0 mol % $ZrO_2$, 0.05 mol % $Y_2O_3$, 1.0 mol % $Nb_2O_5$, 0.5 mol % $Bi_2O_3$, or 0.5 mol % ZnO,
the sum of $Al_2O_3$, $Ga_2O_3$, $ZrO_2$, $Y_2O_3$, $Nb_2O_5$, $B_2O_3$, $Bi_2O_3$, and ZnO is not more than 60 mol %,
the glass composition exhibits a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and
the glass has a glass transition temperature $T_g$ of less than 850° C., and a nonlinear index, $n_2$, of <4.0.

2. The Nd-doped aluminate glass composition according to claim 1, wherein said glass composition contains 0.0-10.00 mol % of $M_2O$, wherein $M_2O$ is the sum of $Li_2O$, $Na_2O$, $K_2O$, and $Cs_2O$.

3. The Nd-doped aluminate glass composition according to claim 1, wherein said glass composition contains 0.0-10.00 mol % of M'O, wherein M'O is the sum of MgO and SrO.

4. The Nd-doped aluminate glass composition according to claim 1, wherein said glass composition contains 10.00-40.00 mol % of $Al_2O_3$.

5. The Nd-doped aluminate glass composition according to claim 1, wherein said glass composition contains 30.00-60.00 mol % of CaO.

6. The Nd-doped aluminate glass composition according to claim 1, wherein said glass composition contains 2.00-8.00 mol % BaO.

7. The Nd-doped aluminate glass composition according to claim 1, wherein said glass composition contains 5.00-20.00 mol % of $SiO_2$.

8. The Nd-doped aluminate glass composition according to claim 1, wherein said glass composition contains 1.00-20.00 mol % of $B_2O_3$.

9. The Nd-doped aluminate glass composition according to claim 1, wherein said glass composition contains 0.25-3.00 mol % $Nd_2O_3$.

10. The Nd-doped aluminate glass composition according to claim 1, wherein said glass composition contains 5.00-40.00 mol % of $Ga_2O_3$.

11. The Nd-doped aluminate glass composition according to claim 1, wherein said glass composition contains 1.00-10.00 mol % of $ZrO_2$.

12. The Nd-doped aluminate glass composition according to claim 1, wherein said glass composition contains 0.05-10.00 mol % of $Y_2O_3$.

13. The Nd-doped aluminate glass composition according to claim 1, wherein said glass composition contains 1.00-10.00 mol % of $Nb_2O_5$.

14. The Nd-doped aluminate glass composition according to claim 1, wherein said glass composition contains 0.75-8.00 mol % of $Bi_2O_3$.

15. The Nd-doped aluminate glass composition according to claim 1, wherein said glass composition contains 0.50-10.00 mol % of ZnO.

16. The Nd-doped aluminate glass composition according to claim 1, wherein said glass composition comprises (based on mol %):

| | |
|---|---|
| $Al_2O_3$ | 15.00-40.00 |
| CaO | 45-62.00 |
| BaO | 0.0-5.0 |
| $SiO_2$ | 5.00-10.00 |
| $Nd_2O_3$ | 0.25-3.00 |
| $Ga_2O_3$ | 0.00-35.00 |
| $ZrO_2$ | 0.00-8.00 |
| $Y_2O_3$ | 0.00-8.00 |
| $Nb_2O_5$ | 0.00-8.00 |
| $B_2O_3$ | 0.00-10.00 |
| ZnO | 0.00-10.00 |
| $R_2O_3$ | 0.00-5.00 |
| $M_2O$ | 0.00-5.00 |
| M'O | 0.00-5.00 | wherein
the glass contains at least 5.0 mol % $Ga_2O_3$, 1.0 mol % $ZrO_2$, 0.05 mol % $Y_2O_3$, 1.0 mol % $Nb_2O_5$, 0.5 mol % $Bi_2O_3$, or 0.5 mol % ZnO, and
the sum of $Al_2O_3$, $Ga_2O_3$, $ZrO_2$, $Y_2O_3$, $Nb_2O_5$, $Bi_2O_3$, and ZnO is not more than 40 mol %,
$R_2O_3$ is the sum of $Gd_2O_3$ and $La_2O_3$,
$M_2O$ is the sum of $Li_2O$, $Na_2O$, $K_2O$, and $Cs_2O$,
M'O is the sum of MgO and SrO,
the glass composition exhibits a peak emission wavelength of longer than 1059.7 nm, and/or an emission cross section ($\sigma_{em}$) of $\geq 1.5 \times 10^{-20}$ cm$^2$, and/or an emission bandwidth ($\Delta\lambda_{eff}$) of $\geq 25$ nm, and
a glass transition temperature $T_g$ of less than 850° C., and a nonlinear index, $n_2$, of <4.0.

17. The Nd-doped aluminate glass composition according to claim 1, wherein said glass composition contains 35.00-55.00 mol % CaO.

18. The Nd-doped aluminate glass composition according to claim 1, wherein said glass composition contains 40.00-55.00 mol % CaO.

19. The Nd-doped aluminate glass composition according to claim 1, wherein said glass composition contains 45.00-55.00 mol % CaO.

20. The Nd-doped aluminate glass composition according to claim 1, wherein said glass composition contains 8.00-15.00 mol % $SiO_2$.

21. The Nd-doped aluminate glass composition according to claim 1, wherein said glass composition contains 8.00-12.00 mol % $SiO_2$.

22. The Nd-doped aluminate glass composition according to claim 1, wherein said glass composition contains 3.00-7.00 mol % BaO.

23. The Nd-doped aluminate glass composition according to claim 1, wherein said glass composition contains 4.00-6.00 mol % BaO.

24. The Nd-doped aluminate glass composition according to claim 1, wherein said glass composition contains 0.0-10 mol % of $R'_2O_3$, wherein $R'_2O_3$ is the sum of $Gd_2O_3$ and $La_2O_3$.

25. The Nd-doped aluminate glass composition according to claim 3, wherein said glass composition contains 0.0-10.00 mol % of $M_2O$, wherein $M_2O$ is the sum of $Li_2O$, $Na_2O$, $K_2O$, and $Cs_2O$.

26. In a solid state, mixed glass, laser system comprising a Nd-doped phosphate glass and another Nd-doped glass as the solid gain medium and a pumping source, the improvement wherein said another Nd-doped glass is a glass having a composition in according to claim 1.

27. A laser system according to claim 26, wherein the power output of system is at least a pettawatt per pulse or greater.

* * * * *

UNITED STATES PATENT AND TRADEMARK OFFICE
CERTIFICATE OF CORRECTION

PATENT NO.         : 8,951,925 B2
APPLICATION NO.    : 13/687476
DATED              : February 10, 2015
INVENTOR(S)        : Simi George et al.

It is certified that error appears in the above-identified patent and that said Letters Patent is hereby corrected as shown below:

In the Specification

At column 1, after the 'Title', and before the 'Summary of the Invention' please insert the following paragraph:

--This invention was made with Government support under FA9451-11-C-0274 awarded by AFRL/RDKL AF Research Agency of the Defense Department. The Government has certain rights in the invention.--.

Signed and Sealed this
Twenty-third Day of June, 2015

Michelle K. Lee
*Director of the United States Patent and Trademark Office*